United States Patent [19]

Mano et al.

[11] 4,354,741
[45] Oct. 19, 1982

[54] ELECTROCHROMIC DISPLAY DEVICE

[75] Inventors: Hiroshi Mano; Satsuki Kawauchi, both of Osaka, Japan

[73] Assignee: Sumitomo Electric Industries, Ltd., Osaka, Japan

[21] Appl. No.: 185,844

[22] Filed: Sep. 10, 1980

[30] Foreign Application Priority Data

Oct. 12, 1979 [JP] Japan .................................. 54-132038
Oct. 23, 1979 [JP] Japan .................................. 54-136927

[51] Int. Cl.$^3$ .............................................. G02F 1/17
[52] U.S. Cl. ......................................... 350/357; 29/570
[58] Field of Search ..................... 350/357; 427/57; 29/570

[56] References Cited

U.S. PATENT DOCUMENTS

| 3,971,110 | 7/1976 | Thomas et al. | 427/57 X |
| 4,066,336 | 1/1978 | Zeller | 350/357 |
| 4,235,528 | 11/1980 | Yano et al. | 350/357 |

FOREIGN PATENT DOCUMENTS

| 2802728 | 7/1978 | Fed. Rep. of Germany | 350/357 |
| 2844593 | 4/1980 | Fed. Rep. of Germany | 427/57 |
| 54-141152 | 11/1979 | Japan | 350/357 |

Primary Examiner—James W. Davie
Attorney, Agent, or Firm—Sughrue, Mion, Zinn, Macpeak & Seas

[57] ABSTRACT

An electrochromic display device and apparatus for producing such a device including a display electrode, a confronting electrode, and an electrolyte-impregnated porous layer disposed between the electrodes. The porous member has an average pore diameter of 0.1 to 50 μm with porous spaces occupying at least 30% by volume of the porous member. Pigment is held in the porous spaces to an extent of 1 to 50% by volume of the porous spaces. With this construction, the display device provides an excellent display background.

13 Claims, 2 Drawing Figures

ELECTROCHROMIC DISPLAY DEVICE

BACKGROUND OF THE INVENTION

The present invention relates to electrochromic display devices utilizing the electrochromism effect which is a reversible coloring or light emitting phenomenon of a material due to electrical action. More particularly, the invention relates to a reflection type electrochromic display device which provides an excellent display background.

As is generally known, an electrochromic display device is made up of a display electrode, a confronting electrode, and an electrolyte. The electrochromic material is provided in the form of a film on a transparent conductive layer either as a part of the display electrode or dissolved in the electrolyte.

Examples of the electrochromic materials known in the art are inorganic electrochromic materials such as tungsten oxide, molybdenum oxide and silver iodide, and organic electrochromic materials such as compounds of viologens. The electrolyte employed is prepared by adding a mixture of sulfuric acid and glycerol or electrolyte such as lithium perchlorate or potassium bromide to a solvent such as water, propylene carbonate, cellosolve acetate, carbitol acetate, or γ-butyrolactone.

The electrochromic display devices are classified into transmission and reflection type devices. In general, the reflection type electrochromic display device is made by colored electrochromic material on a background. In order to provide this background, insoluble white material such as titanium oxide or barium sulfate is mixed and dispersed in an electrolyte. As a result of the mixing of such white material, when the electrochromic material is colored, the display background has a high contrast and the confronting electrode can be hidden. However, the material thus mixed and dispersed often disadvantageously separates over a long period of time or its concentration becomes non-uniform because of aggregation.

In the above-described method, the type and quantity of material to be mixed and dispersed are limited and therefore the thickness of the electrolyte-impregnated layer must be increased before it is applied to an actual electrochromic display device. In order to solve these problems, a method has been proposed in which a porous member is used as the electrolyte-impregnated layer to provide the display background. However, that method is still disadvantageous in that it is difficult to sufficiently hide the base, and the electrical resistance of the electrolyte-impregnated layer is increased excessively. Thus, no fully acceptable electrolyte-impregnated layer for the display background has hitherto been known.

SUMMARY OF THE INVENTION

In order to overcome these difficulties, the present invention provides an electrochromic display device including a display electrode, a confronting electrode, and a porous member used as an electrolyte-impregnated layer between the electrodes in which, according to the invention, the porous member has an average pore diameter of 0.1 to 50 μm, porous spaces occupy at least 30% by volume of the porous member, at least a pigment is held in the porous spaces, and the pigment occupies 1 to 50% by volume of the porous spaces. The electrochromic display device of the invention, unlike a conventional display device of this type, has an excellent display background. The invention also relates to a method for producing such a display device.

The porous member is preferably in the form of a sheet having a thickness of 0.03 to 2 mm and with the amount of pigment held in the porous member being at least 3 ml/m$^2$. The pigment may contain at least 50% by volume of titanium dioxide with the pigment then occupying 2 to 25% by volume of the porous spaces. The porous member may be composed of a material having a microstructure made up of fibrils and nodes made by connecting the fibrils. The porous member may be made of polytetrafluoroethylene. Alternatively, the porous member may be made from polypropylene or polyethylene. The pigment dispersant solution can be impregnated into the porous member by the use of ultrasonic waves or by mechanically rubbing the porous member with the dispersant solution.

DESCRIPTION OF THE PREFERRED EMBODIMENTS

In an electrochromic display device constructed according to the invention, a porous member is provided as an electrolyte impregnated layer between a display electrode and a confronting electrode so as to hide a base member by pigment held in the pores or porous spaces thereby to provide a colored display background. Accordingly, the porous member must be such that the diameter of the pores is large enough to hold the pigment and the porous member should have a sufficient porosity to minimize the increase of the electrical resistance of the electrolyte layer even with the pigment held in the porous spaces to an extent necessary for the display background.

Figure 1:
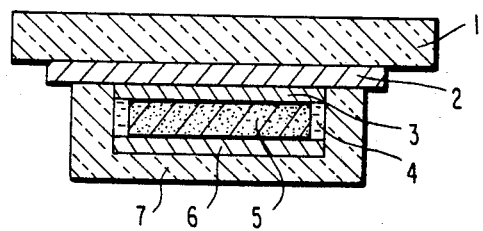
FIG. 1 is a cross-sectional view of an embodiment of the electrochromic display device according to the present invention.

As illustrated in FIG. 1, the electrochromic display device includes a glass plate 1, a transparent conductive layer 2, electrochromic materials 3, electrolyte 4, the porous member 5, the confronting electrode 6 and a container 7.

It is necessary that the diameter of each pore in the porous member be larger than the grain size of the pigment. However, if the pore diameter is excessively large, the individual pores can be visually distinguished which disturbs the uniform appearance of the display background. Based on this fact, it has been found that, if ordinary pigments are used as described below, a porous member having an average pore diameter of 0.1 to 50 μm is suitable and the percentage of the porous spaces in the porous material is at least 30% by volume.

The porous member may be made of any suitable material free of electrolyte. Particular suitable examples of the material of the porous member are polytetrafluoroethylene, polypropylene and polyethylene. It has been found that a porous member having pores of extremely small diameter formed by stretching the above-described material into a layer of desired thickness satisfies the requirements of pore diameter and porosity described above and its performance is excellent in close contact with the display surface due to its flexibility and its pigment-holding characteristic due to its microstructure is quite satisfactory.

Figure 2:
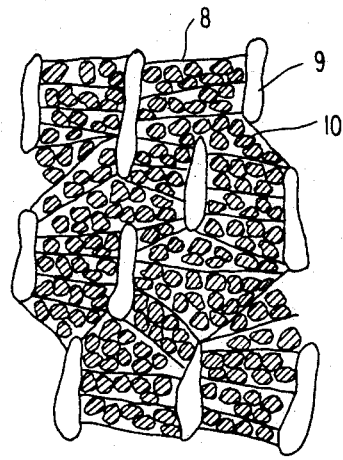
FIG. 2 is an enlarged view of the porous member used in the embodiment shown in FIG. 1.

A method of manufacturing the porous member is well known in the art. However, by way of example, a method of manufacturing a polytetrafluoroethylene porous member will be briefly described. Fundamentally, the polytetrafluoroethylene porous member can be manufactured according to a method disclosed by Japanese Published Patent Application No. 13560/1967. In accordance with that method, polytetrafluoroethylene powder which has not been sintered is mixed with a liquid lubricant and the resultant mixture is molded into a desired shape through extruding and rolling. The liquid lubricant is removed from the molded product thus obtained by extraction or heating. Alternatively, the liquid lubricant may be retained in the molding. Then, the molded product is at least uniaxially stretched. The molded product is heated at a temperature higher by about 327° C. than the sintering temperature while thermal contraction thereof is prevented and stretched. The resultant structure of the molded product thus treated is fixed by sintering as a result of which the desired polytetrafluoroethylene porous member of higher strength is formed. A porous member thus formed has a microstructure (see FIG. 2) of extremely thin fibrils 8 and nodes 9 formed by connecting the fibrils. The diameter and length of the fibrils and the size and number of the nodes depend on the spreading and sintering conditions. Therefore, a pore diameter and porosity suitable for use with the invention can be readily imparted to the porous material. When a porous member having such a microstructure is used, the pigment 10 is held in the microstructure. At this point, the porous member is suitable for use in an electrochromic display device according to the invention.

In accordance with the invention, the pigment is held in the porous spaces of the porous member to form the display background. It also serves to improve the electrolyte wetting characteristic of the porous member. Example of pigments suitable for use with the invention are titanium white, zinc white, lead white, lithopone, titanium yellow, ultramarine, Prussian blue, cobalt blue, vermilion, cadmium red, iron oxide red, iron black, silica, alumina, talc, gypsum, calcium carbonate, barium sulfate, carbon black, iron, copper, lead and tin powders, and various organic pigments. These pigments may be used separately or a plurality of the pigments may be used simultaneously. If necessary, dyes and flurescent pigments may be mixed with the pigments to improve the effect of the display background.

The pigments can be deposited in the porous spaces of the porous member by impregnating the porous member with a pigment dispersant solution. The pigment dispersant solution can be prepared by dispersing the pigment in a liquid which wets the material of the porous member. Examples of a suitable pigment dispersant solution for a porous member made of a hydrophobic material such as polytetrafluoroethylene, polypropylene or polyethylene are liquids having a small surface tension such as methanol, ethanol, isopropyl alcohol, acetone, methylethyl ketone, hexane and surface active agent solutions. In the case where the pigment dispersant solution is a liquid having a large in surface tension (for instance, water) which does not wet the material of the porous member, according to a method disclosed by Japanese Published Patent Application No. 8505/1967 the porous spaces or pores in the porous member are filled with a wetting liquid following which the wetting liquid is replaced by a suitable liquid.

The porous member should be able to hold the pigment to an extent that the pigment hides the base and the display background is suitably colored. However, if the amount of pigment held by the porous member is increased to the extent that the porous spaces are completely filled with the pigment, the electrical resistance of the electrolyte-impregnated layer would be excessively increased. If the porous member is made of hydrophobic material, it is necessary to allow the porous member to hold an amount of pigment which is more than that required for imparting an electrolyte wetting characteristic to the porous member. It has been found that, in the case of the above-described ordinary pigments, a porous member is suitable in which the percentage of the pigment occupying the porous spaces is 1 to 50% by volume. Especially when the pigment includes titanium oxide of more than 50% by volume, a porous member is suitable in which the percentage of the pigment occupying the porous spaces is 2 to 25% by volume.

In an electrochromic display device according to the invention, the configuration of the porous member is not particularly limited. However, in general, a porous member in the form of a sheet is extensively employed. The thickness of a sheet-shaped porous member is generally from 0.03 to 2 mm. It has been found that, in the case of using a porous member whose thickness is in this range, the amount of pigment in the porous member should be more than 3 ml per unitary area (1 $m^2$) of the porous member to provide a satisfactory display background.

Methods for impregnating the pigment dispersant solution into the porous spaces of the porous member have been intensively investigated. As a result, a method of impregnating the pigment dispersant solution into the porous spaces in the porous member utilizing ultrasonic wave and a method of mechanically rubbing the dispersant solution into the porous space have been found to be suitable. In the method utilizing ultrasonic waves, ultrasonic waves are applied to the porous member immersed in the pigment dispersant solution. This method is effective especially for a porous member having a microstructure made of fibrils and nodes. In this case, the pigment is positively held in the microstructure. The amount of pigment held in the porous spaces of the porous member can be increased by repeatedly carrying out impregnating and drying of the pigment dispersant solution.

A porous member of the invention holds pigment uniformly in the porous spaces to the extent that the amount of pigment is sufficient for the display background. A porous member made of a material such as polytetrafluoroethylene, polypropylene or polyethylene has an excellent chemical resistance and therefore it can be sufficiently withstand the electrolyte. Accordingly, when such a material is employed as an electrolyte-impregnated layer, its electrical resistance is hardly increased at all. Thus, an electrochromic display device using such a porous member as an electrolyte-impregnated layer, unlike the conventional electrochronic display device, provides a clear display on an excellent display background. Furthermore, a porous member made of resin such as polytetrafluoroethylene, polypropylene or polyethylene is flexible and therefore it can be brought satisfactorily into close contact with the surface of the display electrode.

If it is desired to make the porous member extremely thin, for instance less than 0.1 mm, the porous member still has a significant effect as a display background and the thickness of an electrolyte-impregnated layer formed by impregnating electrolyte in the porous member can moreover be reduced as much. Therefore, the amount of electrolyte can be reduced and the electrical resistance of the electrolyte-impregnated layer is not increased. Thus, the porous member has economic advantages. The advantage that the thickness can be reduced contributes to a reduction of the thickness of the composite display device. Accordingly, an electrochromic display device constructed according to the invention can be effectively utilized as a display device of small size and light weight.

Because of these significant merits, an electrochromic display device of the invention can advantageously be used as a component in a watch, a desk-top or portable electronic calculator, a measuring instrument, a control board, a road sign or a guide board.

Actual examples of an electrochromic display device of the invention are described below. However, it should be noted that the invention is not limited thereto or thereby.

EXAMPLE 1

Titanium white pigment "Tipaque CR-90" (manufactured by Ishihara Sangyo and containing titanium oxide 90%) in an amount of 150 g was mixed with 1 liter of isopropyl alcohol to prepare a dispersant solution. The dispersant solution was put in a metal container and was then placed on an ultrasonic vibrator and exposed to ultrasonic waves at 28 KHz and 1200 W. While the ultrasonic waves were being aplied to the dispersant solution, a porous film sheet of "Poreflon FP-1000" (made by Sumitomo Electric Industries, ltd.) was immersed in the dispersant solution for fifteen seconds. The sheet was made of polytetrafluoroethylene and had an average pore diameter of 10.0 $\mu$m, a porosity of 86% and a thickness of 0.1 mm. Thereafter, the sheet was washed and dried by heating. Then, the sheet was set upside down and was impregnated with the dispersant solution using ultrasonic waves and afterward washed and dried once more. The sheet-shaped porous member thus formed held the titanium white pigment in the porous spaces thereof with the percentage of the pigment occupying the porous spaces being 12% by volume.

The sheet-shaped porous member holding the pigment was employed as the electrolyte-impregnated layer of an electrochromic display device with tungsten oxide as the electrochromic material. Electrolyte prepared by dissolving lithium perchlorate in $\gamma$-butyrolactone at a concentration of 1.0 M was impregnated into the porous member. In the electrochromic display device thus constructed, the increase of the electrical resistance of the electrolyte impregnated layer due to the employment of the porous member was only several percent. Upon application of a voltage in the display direction, a blue display was fomed on a white background with a resolution which could not be achieved by a conventional electrochromic display device.

EXAMPLE 2

Titanium yellow pigment "Tipaque Yellow TY-70" (made by Ishihara Sankyo and containing titanium oxide 78%) in an amount of 200 g was mixed with 1 liter of ethyl alcohol to prepare a dispersant solution. The dispersant solution was mechanically rubbed into a porous film sheet of "poreflon FT-500" (made by Sumitomo Electric Industries, Ltd.) through one side thereof. The sheet was made of polytetrafluoroethylene and had an average pore diameter of 5.0 $\mu$m, a porosity of 80%, and a thickness of 0.38 mm. Similarly, the dispersant solution was mechanically rubbed into the sheet through the opposite side thereof. Thereafter, the sheet was washed and dried by heating. The sheet-shaped porous member held the titanium pigment in the porous spaces and the percentage of the pigment occupying the porous spaces was 6% by volume. In an electrochromic display device employing the porous member as its electrolyte-impregnated layer, a display was formed on a yellow background. The result was excellent similar to the case of Example 1.

What is claimed is:

1. An electrochromic display device comprising: a display electrode; a confronting electrode; and an electrolyte-impregnated porous member disposed between said electrodes, said porous member having an average pore diameter of 0.1 to 50 $\mu$m, porous spaces occupying at least 30% by volume of said porous member; and at least pigment being held in said porous spaces, said pigment occupying 1 to 50% by volume of said porous spaces; and wherein said porous member comprises a material having a microstructure made up of fibrils and nodes formed by connecting said fibrils.

2. The device as claimed in claim 1 wherein said porous member is in the form of a sheet 0.03 to 2 mm in thickness and the amount of said pigment held by said porous member is at least 3 ml/m$^2$.

3. The device as claimed in claim 1 wherein said pigment contains at least 50% by volume of titanium dioxide and said pigment occupies 2 to 25% by volume of said porous spaces.

4. The device as claimed in claim 1 wherein said porous member comprises polytetrafluoroethylene.

5. The device as claimed in claim 1 wherein said porous member comprises a material selected from the group consisting of polypropylene and polyethylene.

6. A method for producing an electrolyte-impregnated porous layer for use in an electrochromic display device comprising the steps of: providing a porous member as a material having a microstructure made up of fibrils and nodes formed by connecting said fibrils, said porous member having an average pore diameter of 0.1 to 50 $\mu$m with porous spaces occupying at least 30% by volume of said porous member and impregnating said porous member with a pigment dispersant solution so that said pigment occupies 1 to 50% by volume of said porous space, providing said porous member in said electrochromic display device and impregnating electrolyte therein.

7. The method as claimed in claim 6 wherein said step of impregnating said porous member comprises immersing said porous member in said pigment dispersant solution and applying ultrasonic waves to said porous member immersed in said pigment dispersant solution.

8. The method as claimed in claim 6 wherein said porous member is provided in the form of a sheet 0.03 to 2 mm in thickness and wherein the amount of said pigment held by said porous member is at least 3 ml/m$^2$.

9. The method as claimed in claim 6 wherein said pigment contains at least 50% by volume of titanium dioxide and said pigment occupies 2 to 25% by volume of said porous spaces.

10. The method as claimed in claim 6 wherein said porous member comprises polytetrafluoroethylene.

11. The method as claimed in claim 6 wherein said porous member comprises a material selected from the group consisting of polypropylene and polyethylene.

12. The method as claimed in claim 6 wherein the solution is dried to cause said porous spaces to hold said pigment.

13. The method as claimed in claim 6 wherein said solution is mechanically rubbed into the porous spaces in said porous member.

* * * * *